(12) United States Patent
Kwon et al.

(10) Patent No.: US 11,731,750 B2
(45) Date of Patent: Aug. 22, 2023

(54) FUEL SUPPLY SYSTEM FOR ECO-FRIENDLY SHIP

(71) Applicant: DAEWOO SHIPBUILDING & MARINE ENGINEERING CO., LTD., Geoje-si (KR)

(72) Inventors: Hyuk Kwon, Seoul (KR); Su Kyung An, Gwangmyeong-si (KR); Seung Woo Jeong, Seoul (KR); Min Cheol Ryu, Seoul (KR); Geum Jun Gang, Seoul (KR)

(73) Assignee: DAEWOO SHIPBUILDING & MARINE ENGINEERING CO., LTD., Geoje-si (KR)

( * ) Notice: Subject to any disclaimer, the term of this patent is extended or adjusted under 35 U.S.C. 154(b) by 0 days.

(21) Appl. No.: 17/607,263

(22) PCT Filed: Jan. 23, 2020

(86) PCT No.: PCT/KR2020/001198
§ 371 (c)(1),
(2) Date: Oct. 28, 2021

(87) PCT Pub. No.: WO2020/230979
PCT Pub. Date: Nov. 19, 2020

(65) Prior Publication Data
US 2022/0185441 A1 Jun. 16, 2022

(30) Foreign Application Priority Data

May 14, 2019 (KR) .................. 10-2019-0056202
May 14, 2019 (KR) .................. 10-2019-0056203

(51) Int. Cl.
*B63H 21/38* (2006.01)
*B63H 21/14* (2006.01)
(Continued)

(52) U.S. Cl.
CPC ............ *B63H 21/38* (2013.01); *B63H 21/14* (2013.01); *F01N 3/208* (2013.01);
(Continued)

(58) Field of Classification Search
CPC combination set(s) only.
See application file for complete search history.

(56) References Cited

U.S. PATENT DOCUMENTS 8,240,277 B1 * 8/2012 Michikawauchi .......................... F02M 21/0287
123/1 A
8,370,049 B1 2/2013 Shimizu et al.
(Continued)

FOREIGN PATENT DOCUMENTS

EP 2664777 A1 11/2013
EP 2955345 A1 12/2015
(Continued)

OTHER PUBLICATIONS

International Search Report from corresponding International Patent Application No. PCT/KR2020/001198, dated Apr. 29, 2020.
(Continued)

*Primary Examiner* — Binh Q Tran
(74) *Attorney, Agent, or Firm* — K&L Gates LLP

(57) ABSTRACT

The present invention provides a fuel supply system, for an eco-friendly ship, which selectively uses an existing fuel and an ammonia fuel or uses a mixture thereof as a fuel for a propulsion engine and a power generation engine of a ship so as to follow ship greenhouse gas regulations to be reinforced in phases at major points until 2050.

12 Claims, 3 Drawing Sheets

(51) Int. Cl.
*F01N 3/20* (2006.01)
*F02D 19/06* (2006.01)
*F02D 19/08* (2006.01)

(52) U.S. Cl.
CPC ....... *F02D 19/0647* (2013.01); *F02D 19/087* (2013.01); *F01N 3/206* (2013.01); *F01N 3/2066* (2013.01); *F01N 2430/04* (2013.01); *F01N 2570/18* (2013.01); *F01N 2590/02* (2013.01); *F01N 2610/02* (2013.01); *F01N 2610/03* (2013.01); *F01N 2610/04* (2013.01); *F01N 2610/10* (2013.01); *F01N 2610/102* (2013.01); *F01N 2900/04* (2013.01); *F01N 2900/14* (2013.01); *F01N 2900/1402* (2013.01); *F01N 2900/1614* (2013.01); *F01N 2900/1616* (2013.01); *F01N 2900/1618* (2013.01); *F01N 2900/18* (2013.01); *F02D 19/0613* (2013.01); *F02D 19/0639* (2013.01); *F02D 19/0642* (2013.01); *F02D 19/0644* (2013.01); *F02D 19/081* (2013.01)

(56) References Cited

U.S. PATENT DOCUMENTS

| | | | |
|---|---|---|---|
| 2010/0288249 A1 | 11/2010 | Sasaki et al. | |
| 2011/0264355 A1* | 10/2011 | Iwatani | F02M 43/00 123/575 |
| 2011/0265455 A1* | 11/2011 | Hirota | F02D 19/0644 60/285 |
| 2011/0265464 A1* | 11/2011 | Kojima | F02M 25/0224 60/299 |
| 2012/0004831 A1* | 1/2012 | Miyagawa | F02D 41/0025 701/103 |
| 2012/0036842 A1* | 2/2012 | Nakamura | F01N 3/2073 60/287 |
| 2014/0261322 A1 | 9/2014 | Geckler et al. | |
| 2019/0136776 A1* | 5/2019 | Dudar | F01N 13/009 |

FOREIGN PATENT DOCUMENTS

| | | |
|---|---|---|
| EP | 3192997 A1 | 7/2017 |
| JP | 2011-47384 A | 3/2011 |
| JP | 2013-113153 A | 6/2013 |
| JP | 2015-135067 A | 7/2015 |
| JP | 2015135067 A | 7/2015 |
| JP | 2018-162751 A | 10/2018 |
| JP | 2018162751 A | 10/2018 |
| KR | 10-2011-0082614 A | 7/2011 |
| KR | 20110082614 A | 7/2011 |
| KR | 10-2019-0004474 A | 1/2019 |
| KR | 20190004474 A | 1/2019 |
| KR | 10-2019-0042280 A | 4/2019 |
| WO | 2010/125659 A1 | 11/2010 |
| WO | 2011/132604 A1 | 10/2011 |
| WO | 2011/136034 A1 | 11/2011 |
| WO | 2020183522 A1 | 9/2020 |

OTHER PUBLICATIONS

Extended European Search Report dated Nov. 1, 2023 in European Patent Application No. 20806212.5.

Office Action dated Oct. 18, 2022 in Japanese Patent Application No. 2021-560008.

Kazuka Harumi, Experimental Study on the Utilization of Ammonia Fuel in Marine Diesel Engines, Mar. 2019, 23 pages, Japan.

Yoichi Niki, Sumito Nishio, Yoshiko Nitta, Yasuhisa Ichikawa, Hideki Sekiguchi, Koichi Hirata, Mixed combustion operation of diesel engine using ammonia, 2016, 7 pages, Japan.

* cited by examiner (a)

(b)

FUEL SUPPLY SYSTEM FOR ECO-FRIENDLY SHIP

TECHNICAL FIELD

The present invention relates to a fuel supply system for eco-friendly ships, and more particularly to a fuel supply system for eco-friendly ships, which can selectively or simultaneously supply an existing fuel and ammonia fuel to an engine of a ship to comply with regulations on shipping's greenhouse gas emissions to be tightened in phases until 2050.

BACKGROUND ART

As international regulations on gas emissions from shipping are tightened as part of environmental regulations for prevention of global warming and climate change, countries around the world are focusing on developing eco-friendly, low-carbon fueled ships.

In addition, the International Maritime Organization (IMO), the European Union, and the United States plan to greatly tighten regulations on pollutant emissions from shipping in response to climate change and increase in air pollution.

Until now, liquefied natural gas (LNG) has been considered as a leading alternative to existing fossil fuels. In fact, more than 432 LNG ships are in service as of September 2018 and play a major role in reducing $SO_x$ emissions and $NO_x$ emissions (LNG reducing $SO_x$ emissions by 92% and $NO_x$ emissions by 80%, as compared to heavy fuel oil (HFO)).

However, LNG fuel has drawbacks of: insufficient construction of relevant infrastructure (such as LNG bunker ports and bunkering ships); price volatility of LNG fuel; concerns of increase in greenhouse gas emissions due to methane slip in LNG engines; and the risk of leakage or fire/explosion.

IMO's current marine greenhouse gas/carbon dioxide reduction goals are as follows:

1) Marine greenhouse gas emission reduction goal: IMO aims to reduce marine greenhouse gas emissions by 50% by 2050, as compared to greenhouse gas (GHG) emissions from international shipping in 2008 (for reference, greenhouse gases include methane ($CH_4$), carbon dioxide ($CO_2$), carbon monoxide (CO), ozone ($O_3$), chlorofluorocarbons (CFCs), and the like).

2) Carbon intensity reduction goal: IMO aims to reduce carbon dioxide ($CO_2$) emissions per transport work by 40% by 2030 and 70% by 2050, as compared to carbon dioxide ($CO_2$) emissions from international shipping in 2008.

As regulations on shipping's greenhouse gas emissions are planned to be tightened in phases until 2050, existing engines and fuels are not anticipated to meet greenhouse gas standards.

This is also true of LNG fuel, which has been proven as an alternative for reducing shipping's greenhouse gas emissions. LNG fuel only has limited effects on reduction in $CO_2$ emissions (only by 15% to 25%, as compared to HFO) and thus is not anticipated to meet regulations on shipping's GHG emissions, like other existing fuels, when viewed from a long-term perspective.

According to a UMAS report, use of LNG will not be effective in reducing exhaust gas emissions in terms of the total emissions due to increase in global shipping caused by increase in trade by 2050 and adverse effects of emission of unburned methane gas into the atmosphere will offset beneficial effects of use of LNG on reduction in exhaust gas emissions.

DISCLOSURE

Technical Problem

With regulations on shipping's greenhouse gas emissions planned to be tightened in phases in the coming years, it is anticipated that it will be difficult to use existing fossil fuels. Therefore, there is an urgent need for alternative fuels that can meet the regulations to be tightened in the coming years.

In addition, although substituting existing fossil fuels with eco-friendly fuels such as LNG may be considered in the short to medium term, more futuristic alternatives are needed in the long term. These alternatives include substituting existing marine fuels with non-fossil fuels, such as hydrogen, ammonia ($NH_3$), biofuels, solar energy, and wind energy.

It is an aspect of the present invention to provide a fuel supply system for eco-friendly ships, which can meet regulations on shipping's greenhouse gas emissions to tightened in the coming years using ammonia which is a chemical substance that has been used in onshore applications for more than 100 years and has a fully tested supply chain, including production/storage/transportation/supply, among the aforementioned non-fossil fuels.

Technical Solution

In accordance with one aspect of the present invention, there is provided a fuel supply system for eco-friendly ships, including: an engine; a fuel storage tank storing a first fuel to be supplied as fuel to the engine; and an ammonia storage tank storing ammonia to be supplied as fuel to the engine, wherein the engine is operated with one selected from among the first fuel and the ammonia or with a fuel mixture of the first fuel and the ammonia.

The fuel supply system may be operated in one of: a first fuel supply mode in which only the first fuel is supplied to the engine; an ammonia supply mode in which only the ammonia is supplied to the engine; and a fuel mixture supply mode in which the fuel mixture of the first fuel and the ammonia is supplied to the engine.

The fuel supply system may further include: a greenhouse gas analyzer disposed on an exhaust line through which exhaust gas discharged from the engine passes and detecting greenhouse gases contained in the exhaust gas, wherein the operation mode of the fuel supply system may be controlled based on values detected by the greenhouse gas analyzer.

When the fuel supply system is operated in the fuel mixture supply mode, a mixing ratio of the first fuel to the ammonia may be regulated based on values detected by the greenhouse gas analyzer.

The fuel supply system may further include: a first control valve disposed on a fuel supply line along which the first fuel is supplied from the fuel storage tank to the engine; and a second control valve disposed on an ammonia supply line along which the ammonia is supplied from the ammonia storage tank to the engine, wherein the first control valve and the second control valve may be controlled based on values detected by the greenhouse gas analyzer.

The fuel supply system may further include: a heater disposed on the ammonia supply line and heating the ammonia to a temperature suitable for use in the engine.

The engine may be an oil engine using a fuel in a liquid state at room temperature, and the first fuel may be one selected from among HFO, LSFO, ULSFO, MGO, and MeOH.

Alternatively, the engine may be a gas engine using a fuel in a gaseous state at room temperature, and the first fuel may be one selected from among of LNG, LPG, LEG, and DME and may be stored in a liquefied state in the fuel storage tank.

When the engine is a gas engine, the fuel supply system may further include: a vaporizer disposed on the fuel supply line and forcibly vaporizing the first fuel in the liquefied state; and a heater heating the first fuel vaporized by the vaporizer to a temperature suitable for use in the engine.

In accordance with another aspect of the present invention, there is provided a fuel supply system for eco-friendly ships, including: an engine; a fuel storage tank storing a first fuel to be supplied as fuel to the engine; an ammonia storage tank storing ammonia to be supplied as fuel to the engine; and an SCR device disposed on an exhaust line through which exhaust gas discharged from the engine passes and reducing nitrogen oxides in the exhaust gas, wherein the engine is operated with one selected from among the first fuel and the ammonia or with a fuel mixture of the first fuel and the ammonia, and the ammonia stored in the ammonia storage tank is supplied selectively or simultaneously to the engine and the SCR device.

The fuel supply system may further include: a first supply line along which the first fuel is supplied from the fuel storage tank to the engine; a second supply line along which the ammonia is supplied from the ammonia storage tank to the engine; and a third supply line along which the ammonia is supplied from the ammonia storage tank to the SCR device, wherein the ammonia serves as a fuel for the engine when supplied along the second supply line and serves as a reducing agent for the SCR device when supplied along the third supply line.

The fuel supply system may further include: a greenhouse gas analyzer disposed on the exhaust line downstream of the engine and detecting greenhouse gases contained in the exhaust gas; and an $NO_x$ analyzer disposed on the exhaust line downstream of the engine and detecting nitrogen oxides contained in the exhaust gas discharged from the engine, wherein supply of the first fuel along the first supply line and supply of the ammonia along the second supply line may be controlled based on values detected by the greenhouse gas analyzer, and supply of the ammonia along the third supply line may be controlled based on values detected by the $NO_x$ analyzer.

The fuel supply system may further include: heaters disposed on the second supply line and the third supply line and heating the ammonia to a temperature suitable for use in the engine and the SCR device, respectively.

The fuel supply system may further include: a return line branched off of the exhaust line downstream of the SCR device and returned to the SCR device, wherein the $NO_x$ analyzer may include: a first $NO_x$ analyzer disposed between the engine and the SCR device; and a second $NO_x$ analyzer disposed downstream of the SCR device, and, when analysis of values detected by the second $NO_x$ analyzer indicates that the concentration of nitrogen oxides in the exhaust gas is greater than a permissible level, the exhaust gas discharged from the SCR device may be returned to the SCR device along the return line.

The first fuel may be one selected from among HFO, LSFO, ULSFO, MGO, MeOH, LNG, LPG, LEG, and DME.

Advantageous Effects

The present invention provides a fuel supply system for eco-friendly ships, which can respond to regulations on shipping's greenhouse gas emissions to be tightened in the coming years by selectively or simultaneously supplying an existing fuel and ammonia fuel as fuel for a propulsion engine and a power generation engine of a ship to enhance reduction in greenhouse gas emissions from the engine.

In addition, the present invention provides sufficient reduction in greenhouse gas emissions using ammonia fuel while allowing full use of an existing fuel supply system and thus can eliminate the need to completely reorganize the existing fuel supply system, thereby minimizing additional investment and space for reducing greenhouse gas emissions from the ship.

Further, the present invention can reduce CAPEX of an ammonia storage/supply system while increasing space utilization of a ship by integrating a system for storage and supply of ammonia required for SCR reaction with a system for storage and supply of ammonia used as fuel for an engine.

BEST MODE

Figure 1:
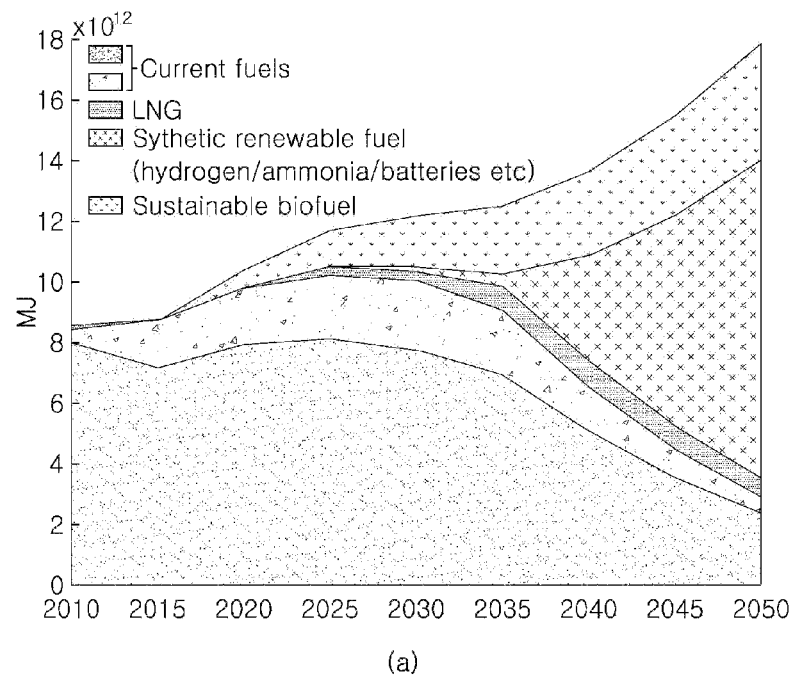
FIG. 1 is a view showing prospects for reduction in greenhouse gas emissions from shipping until 2050, in which (a) shows anticipated changes in fuels for shipping, and (b) shows anticipated changes in energy for shipping.
Figure 1:
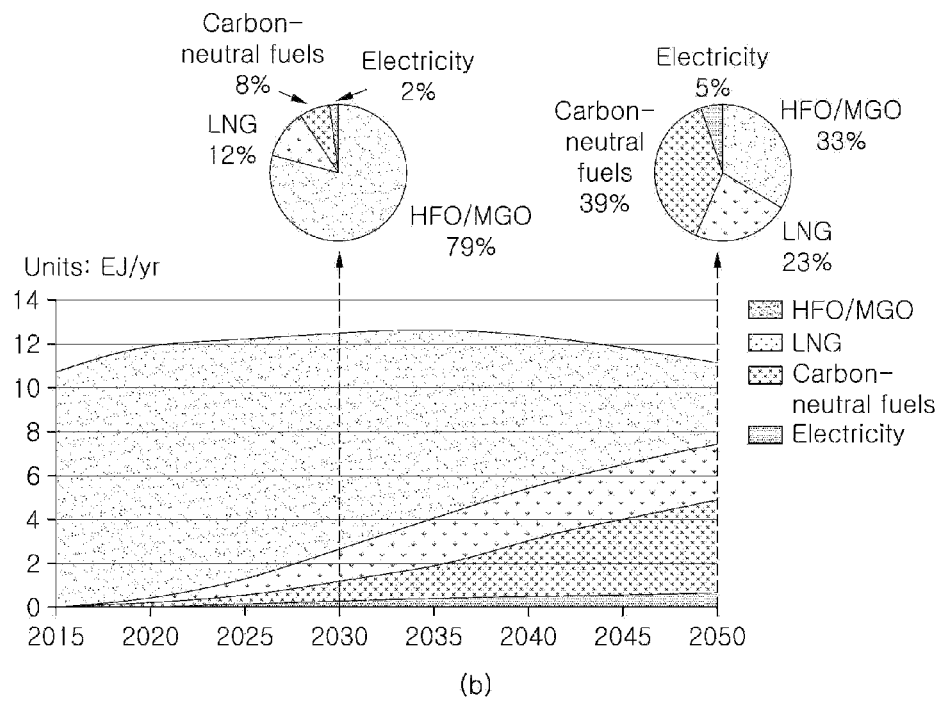

Reference will now be made to the accompanying drawings illustrating exemplary embodiments of the present invention and detailed description with reference to the accompanying drawings in order to fully understand the present invention, operational advantages of the present invention, and objects achieved by practice of the present invention.

Hereinafter, embodiments of the present invention will be described with reference to the accompanying drawings. It should be noted that like components will be denoted by like reference numerals throughout the specification and the accompanying drawings.

Examples of existing marine fuels include high sulfur fuel oil (HSFO), low sulfur fuel oil (LSFO), ultra-low sulfur fuel oil (ULSFO), marine gas oil (MGO), liquefied natural gas (LNG), liquefied petroleum gas (LPG), liquefied ethylene gas (LEG), methanol (MeOH), and dimethyl ether (DME).

Such existing marine fuels are fossil fuel-based fuels, a chemical equation for combustion reaction of which is expressed as $C_xH_y + zO_2 \rightarrow xCO_2 30 \, (y/2)H_2O$, thus making it difficult to respond to regulations on shipping's greenhouse gas emissions.

The present invention provides a fuel supply system that can selectively or simultaneously supply an existing fuel as described above and ammonia fuel as fuel for a propulsion engine and a power generation engine of a ship so as to comply with regulations on shipping's greenhouse gas emissions to be tightened in phases until 2050.

Ammonia is a carbon-free fuel and produces only nitrogen and water and no carbon dioxide during combustion (chemical equation: $4NH_3+3O_2 \rightarrow 2N_2+6H_2O$), thus making it possible to respond to regulations on shipping's greenhouse gas emissions.

Figure 2:
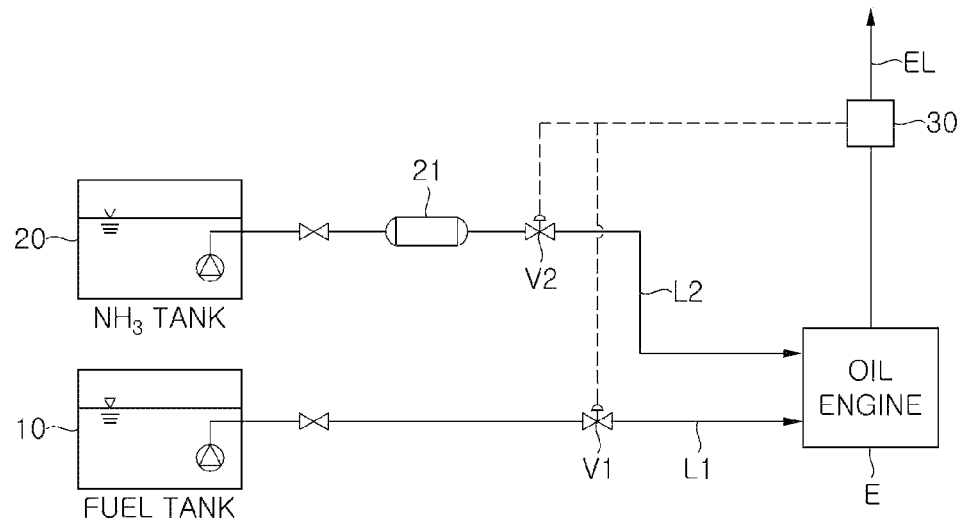
FIG. 2 is a diagram of a fuel supply system for eco-friendly ships according to a first embodiment of the present invention, wherein an engine of a ship is an oil engine.
Figure 3:
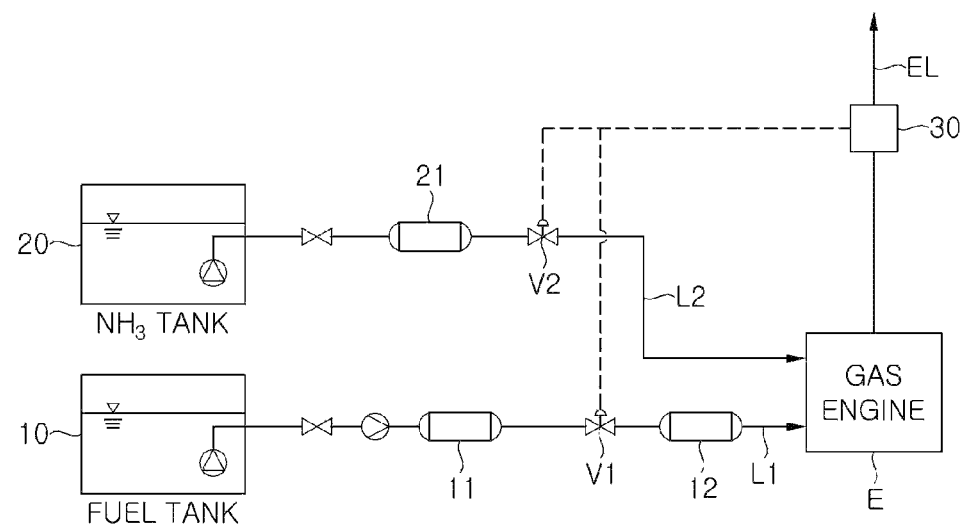
FIG. 3 is a diagram of the fuel supply system for eco-friendly ships according to the first embodiment of the present invention, wherein the engine of the ship is a gas engine.

FIG. 2 and FIG. 3 are diagrams of a fuel supply system for eco-friendly ships according to a first embodiment of the present invention.

Referring to FIG. 2 and FIG. 3, the fuel supply system for eco-friendly ships according to the first embodiment of the present invention includes: a fuel storage tank 10 storing a first fuel to be supplied as fuel to an engine E of a ship; an ammonia storage tank 20 storing ammonia to be supplied as fuel to the engine E; and a greenhouse gas analyzer 30 disposed on an exhaust line EL through which exhaust gas discharged from the engine E passes and measuring greenhouse gases contained in the exhaust gas.

In this embodiment, the engine E may include both a main engine (M/E) for propulsion of the ship and a power generation engine (G/E).

The first fuel stored in the fuel storage tank 10 may include existing fuels as described above, such as HFO, LSFO, ULSFO, MGO, MeOH, LNG, LPG, LEG, and DME.

Here, the embodiment shown in FIG. 2 is applied when the engine E of the ship is an oil engine using a fuel that is in a liquid state at room temperature. Accordingly, the first fuel may be a fuel that is in a liquid state at room temperature, such as HFO, LSFO, ULSFO, MGO, and MeOH.

In the embodiment shown in FIG. 2, the first fuel stored in the fuel storage tank 10 may be one selected from among HFO, LSFO, ULSFO, MGO, and MeOH, and may be stored in a liquid state in the fuel storage tank 10.

In addition, the embodiment shown in FIG. 3 is applied when the engine E of the ship is a gas engine using a fuel that is in a gaseous state at room temperature. Accordingly, the first fuel may be a fuel that is in a gaseous state at room temperature, such as LNG, LPG, LEG, and DME.

In the embodiment shown in FIG. 3, the first fuel stored in the fuel storage tank 10 may be one selected from among LNG, LPG, LEG, and DME, and may be stored in a liquefied state in the fuel storage tank 10. Here, the fuel storage tank 10 may be insulated and sealed to prevent vaporization of the fuel stored in the liquefied state in the fuel storage tank.

In the embodiment shown in FIG. 3, the fuel supply system may further include a vaporizer 11 forcibly vaporizing the liquefied fuel into a gaseous state suitable for use in the engine E and a heater 12 heating the vaporized fuel to a temperature suitable for use in the engine E.

In the first embodiment of the present invention including the embodiments shown in FIG. 2 and FIG. 3, the fuel supply system includes the ammonia storage tank 20 storing ammonia. The ammonia may be stored in liquid form such as aqueous ammonia. Alternatively, the fuel supply system according to this embodiment may include a urea storage tank, instead of the ammonia storage tank, so as to use ammonia produced through hydrolysis of urea as necessary.

The fuel supply system according to this embodiment may use the first fuel stored in the fuel storage tank 10 and the ammonia stored in the ammonia storage tank 20 as fuel for the engine E. Here, the first fuel and the ammonia may be selectively or simultaneously supplied to the engine E.

That is, in this embodiment, the engine E may be operated only with the first fuel supplied from the fuel storage tank 10, may be operated only with the ammonia supplied from the ammonia storage tank 20, or may be operated with a fuel mixture of the first fuel and the ammonia.

The fuel supply system according to this embodiment may be operated in one of the following three modes: A first fuel supply mode in which only the first fuel is supplied as fuel to the engine E; an ammonia supply mode in which only the ammonia is supplied as fuel to the engine E; and a fuel mixture supply mode in which the fuel mixture of the first fuel and the ammonia is supplied as fuel to the engine E.

In addition, the fuel supply system according to this embodiment may be operated in one selected mode out of the aforementioned three modes according to sea areas in which the ship operates.

Specifically, in emission control areas (ECAs), the fuel supply system may be operated in the fuel mixture supply mode in which the fuel mixture of the existing fuel (the first fuel) and the ammonia is used as fuel for the engine. In addition, in Global areas, the fuel supply system may be operated in the first fuel supply mode in which only the existing fuel (the first fuel) is used as fuel for the engine. Further, in sea areas subject to very strict environmental regulations (for example, pristine sea areas such as fjords and the Arctic), the fuel supply system may be operated in the ammonia supply mode in which only the ammonia is used as fuel for the engine.

However, this distinction is merely given as an example and the operation mode of the fuel supply system according to this embodiment is not necessarily determined according to the sea areas in which the ship operates. When there is a need to reduce greenhouse gases in exhaust gas, the operation mode of the fuel supply system may be changed regardless of the sea areas in which the ship operates.

The fuel storage tank 10 and the ammonia storage tank 20 may be connected to the engine E through respective supply lines L1, L2. Control valves V1, V2 may be disposed on the first fuel supply line L1 and the ammonia supply line L2 to control supply of the first fuel and the ammonia, respectively. In addition, a heater 21 may be disposed on the ammonia supply line L2 to heat the ammonia to a temperature suitable for use in the engine E.

When the fuel supply system according to this embodiment is operated in the first fuel supply mode, the first control valve V1 is opened and the second control valve V2 is closed. When the fuel supply system according to this embodiment is operated in the ammonia supply mode, the first control valve V1 is closed and the second control valve V2 is opened.

In addition, when the fuel supply system according to this embodiment is operated in the fuel mixture supply mode, a mixing ratio of the first fuel to the ammonia may be regulated through adjustment of the degree of opening of the first control valve V1 and the second control valve V2.

The operation mode of the fuel supply system according to this embodiment may be controlled based on values detected by the greenhouse gas analyzer 30. Accordingly, control over the first control valve V1 and the second control valve V2 may be performed based on values detected by the greenhouse gas analyzer 30.

In addition, the mixing ratio of the first fuel to the ammonia may be determined by the greenhouse gas analyzer 30. The greenhouse gas analyzer 30 is disposed on the exhaust line EL through which exhaust gas discharged from the engine E passes to detect greenhouse gases contained in the exhaust gas and to regulate the mixing ratio of the first fuel to the ammonia through control over the control valves V1, V2 based on the detected values.

When the fuel supply system is operated in the fuel mixture supply mode, the first fuel and the ammonia supplied along the first fuel supply line L1 and the ammonia supply line L2, respectively, may be thoroughly mixed with each other before the first fuel and the ammonia are supplied to the engine E or before the first fuel and the ammonia are combusted after being supplied to the engine E.

When the fuel mixture of the first fuel and the ammonia is used, carbon dioxide emissions can be reduced in proportion to the amount of the first fuel substituted with the ammonia. For example, when 70% of the existing fuel (the first fuel) is substituted with the ammonia, carbon dioxide emissions during combustion can be reduced by 70%, as compared to when only the existing fuel (the first fuel) is used. A chemical equation for combustion of the fuel mixture of the existing fuel (the first fuel) and the ammonia is expressed as $C_xH_y+4NH_3+(3+z)O_2 \rightarrow xCO_2+2N_2+(6+y/2)H_2O$.

Figure 4:
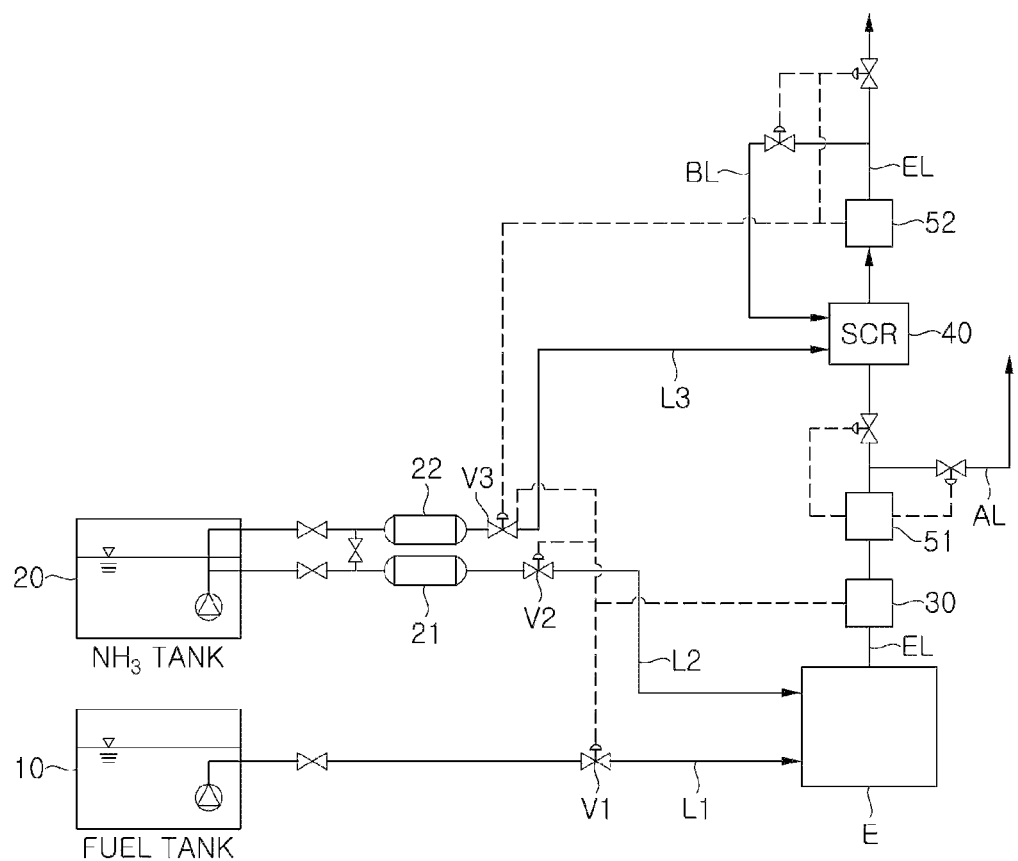
FIG. 4 is a diagram of a fuel supply system for eco-friendly ships according to a second embodiment of the present invention.

FIG. 4 is a diagram of a fuel supply system for eco-friendly ships according to a second embodiment of the present invention.

Referring to FIG. 4, the fuel supply system for eco-friendly ships according to the second embodiment includes the same components as the fuel supply system for eco-friendly ships according to the first embodiment and may further include a selective catalytic reduction (SCR) device disposed on the exhaust line EL through which exhaust gas discharged from the engine E passes to reduce air pollutants contained in the exhaust gas.

In FIG. 4, the fuel supply system according to this embodiment is shown as including additional devices besides basic components as shown in FIG. 2. However, when the engine E is a gas engine, the fuel supply system according to this embodiment may further include a vaporizer 11 and a heater 12 disposed between the fuel storage tank 10 and the engine E, as in the embodiment of FIG. 3.

The SCR device 40 is a device adapted to remove especially nitrogen oxides ($NO_x$), and converts nitrogen oxides into nitrogen and water by allowing exhaust gas at 200° C. to 450° C. to pass through a catalyst layer in the presence of a reducing agent.

The fuel supply system according to this embodiment may further include a first $NO_x$ analyzer 51 disposed on the exhaust line EL downstream of the engine E and detecting the concentration of nitrogen oxides in the exhaust gas. When analysis of values detected by the first $NO_x$ analyzer 51 indicates that reduction of nitrogen oxides is needed, the exhaust gas may be sent to the SCR device 40. Conversely, when analysis of values detected by the first $NO_x$ analyzer 51 indicates that reduction of nitrogen oxides is not needed, the exhaust gas may be discharged directly into the atmosphere (along an AL line).

In addition, the fuel supply system according to this embodiment may further include a second $NO_x$ analyzer 52 disposed downstream of the SCR device 40 and detecting the concentration of nitrogen oxides in the exhaust gas. When analysis of values detected by the second $NO_x$ analyzer 52 indicates that the concentration of nitrogen oxides in the exhaust gas is less than or equal to a permissible level, the exhaust gas may be discharged into the atmosphere. Conversely, when analysis of values detected by the second $NO_x$ analyzer 52 indicates that the concentration of nitrogen oxides in the exhaust gas is greater than the permissible level, the exhaust gas may be returned to the SCR device 40 (along a BL line) to reduce nitrogen oxides.

Ammonia is a reducing agent commonly used in the SCR device. For this reason, a ship is generally provided with a tank for storage of ammonia or a urea storage tank that can produce ammonia through hydrolysis of urea.

In this embodiment, the ammonia storage tank 20 described above may be used as a device for storage of ammonia to be supplied to the SCR device 40.

That is, in this embodiment, the ammonia stored in the ammonia storage tank 20 serves not only as fuel for the engine E but also as the reducing agent used in the SCR device 40.

The ammonia stored in the ammonia storage tank 20 may be supplied to the SCR device 40 along a third supply line L3. A heater 22 heating the ammonia to a temperature suitable for use in the SCR device 40 and a third control valve V3 regulating supply of the ammonia to the SCR device may be disposed on the third supply line L3.

Opening/closing or the degree of opening of the third control valve V3 may be controlled based on values detected by the first $NO_x$ analyzer 51 and the second $NO_x$ analyzer 52.

In the fuel supply system according to this embodiment, the ammonia stored in the ammonia storage tank 20 may be supplied selectively or simultaneously to the engine E and the SCR device 40, as needed.

Specifically, in emission control areas (ECAs) or sea areas subject to very strict environmental regulations (for example, pristine sea areas such as fjords and the Arctic), the ammonia may be supplied to the SCR device 40, whereas, in Global areas, the ammonia may not be supplied to the SCR device 40.

However, this distinction is merely given as an example, it will be understood that the ammonia may be supplied to the SCR device 40 even in Global areas when there is a need to reduce nitrogen oxides in exhaust gas.

Table 1 shows supplies to the engine E and the SCR device 40 depending on sea areas in which the ship operates.

TABLE 1

|  | Engine E | SCR device 40 |
| --- | --- | --- |
| Global areas | First fuel alone | Ammonia (reducing agent) only when necessary |
| ECAs | Fuel mixture of first fuel and ammonia (fuel) | Ammonia (reducing agent) |
| Sea areas subject to very strict environmental regulations | Ammonia (fuel) alone | Ammonia (reducing agent) |

As described above, the present invention provides a fuel supply system which can selectively or simultaneously supply an existing fuel and ammonia fuel to an engine of a ship. Accordingly, when there is a need to reduce greenhouse gas emissions from the ship, a mixture of the existing fuel and the ammonia fuel or only the ammonia fuel is supplied as fuel for the engine, whereby reduction in greenhouse gas emissions from the ship can be easily achieved.

That is, the present invention provides a fuel supply system for eco-friendly ships, which can respond to regulations on shipping's greenhouse gas emissions to be tightened in the coming years by selectively or simultaneously supplying an existing fuel and ammonia fuel as fuel for a propulsion engine and a power generation engine of a ship to enhance reduction in greenhouse gas emissions from the engine.

In addition, the present invention can achieve sufficient reduction in greenhouse gas emissions using the ammonia fuel while allowing full use of an existing fuel supply system. Thus, in order to meet regulations on shipping's greenhouse gas emissions to be tightened in the coming years, the present invention only requires addition of a system for storage/supply of ammonia to the existing fuel supply system without the need to completely reorganize the existing fuel supply system, thereby minimizing additional investment and space for reducing greenhouse gas emissions from the ship.

Conventionally, since an SCR device is used only in NOx emission control areas and not in other areas, utilization of a system responsible for storage/supply of a reducing agent to be supplied to the SCR device has been low. The present invention can reduce CAPEX of an ammonia storage/supply system while increasing space utilization of a ship by providing a system responsible for both storage/supply of ammonia required for SCR reaction and storage/supply of ammonia used as fuel for an engine.

Although some embodiments have been described herein, it should be understood that these embodiments are provided for illustration only and are not to be construed in any way as limiting the present invention, and that various modifications, changes, and alterations can be made by those skilled in the art without departing from the spirit and scope of the invention. Therefore, the appended claims and equivalents thereto are intended to cover such modifications and the like as would fall within the scope and spirit of the invention.

What is claimed is:

1. A fuel supply system for eco-friendly ships, comprising:
    an engine;
    a fuel storage tank storing a first fuel to be supplied as fuel to the engine;
    an ammonia storage tank storing ammonia to be supplied as fuel to the engine, wherein the engine is configured to consume one selected from among the first fuel and the ammonia or a fuel mixture of the first fuel and the ammonia;
    a selective catalytic reduction (SCR) device disposed on an exhaust line through which exhaust gas discharged from the engine passes, wherein the ammonia stored in the ammonia storage tank is supplied selectively or simultaneously to the engine and the SCR device;
    a first supply line along which the first fuel is supplied from the fuel storage tank to the engine;
    a second supply line along which the ammonia is supplied from the ammonia storage tank to the engine;
    a third supply line along which the ammonia is supplied from the ammonia storage tank to the SCR device, wherein the ammonia serves as a fuel for the engine when supplied along the second supply line and serves as a reducing agent for the SCR device when supplied along the third supply line;
    a greenhouse gas analyzer disposed on the exhaust line downstream of the engine and detecting greenhouse gases contained in the exhaust gas; and
    an $NO_x$ analyzer disposed on the exhaust line downstream of the engine and detecting nitrogen oxides contained in the exhaust gas discharged from the engine,
    wherein supply of the first fuel along the first supply line and supply of the ammonia along the second supply line are controlled based on values detected by the greenhouse gas analyzer,
    wherein supply of the ammonia along the third supply line is controlled based on values detected by the $NO_x$ analyzer.

2. The fuel supply system according to claim 1, wherein the fuel supply system is operated in one of: a first fuel supply mode in which only the first fuel is supplied to the engine; an ammonia supply mode in which only the ammonia is supplied to the engine; and a fuel mixture supply mode in which the fuel mixture of the first fuel and the ammonia is supplied to the engine.

3. The fuel supply system according to claim 2, further comprising:
    wherein an operation mode of the fuel supply system is controlled based on values detected by the greenhouse gas analyzer.

4. The fuel supply system according to claim 3, wherein, when the fuel supply system is operated in the fuel mixture supply mode, a mixing ratio of the first fuel to the ammonia is regulated based on values detected by the greenhouse gas analyzer.

5. The fuel supply system according to claim 4, further comprising:
    a first control valve disposed on a fuel supply line along which the first fuel is supplied from the fuel storage tank to the engine; and
    a second control valve disposed on an ammonia supply line along which the ammonia is supplied from the ammonia storage tank to the engine,
    wherein the first control valve and the second control valve are controlled based on values detected by the greenhouse gas analyzer.

6. The fuel supply system according to claim 5, further comprising:
    a heater disposed on the ammonia supply line and heating the ammonia to a temperature suitable for use in the engine.

7. The fuel supply system according to claim 4, wherein the engine is an oil engine using a fuel in a liquid state at room temperature, and the first fuel is one selected from among heavy fuel oil (HFO), low sulfur fuel oil (LSFO), ultra-low sulfur fuel oil (ULSFO), marine gas oil (MGO), and methanol (MeOH).

8. The fuel supply system according to claim 4, wherein the engine is a gas engine using a fuel in a gaseous state at room temperature, and the first fuel is one selected from among of liquefied natural gas (LNG), liquefied petroleum gas (LPG), liquefied ethylene gas LEG), and dimethyl ether (DME), the first fuel being stored in a liquefied state in the fuel storage tank.

9. The fuel supply system according to claim 8, further comprising:
    a vaporizer disposed on the fuel supply line and forcibly vaporizing the first fuel in the liquefied state; and
    a heater heating the first fuel vaporized by the vaporizer to a temperature suitable for use in the engine.

10. The fuel supply system according to claim 1, further comprising:
    heaters disposed on the second supply line and the third supply line and heating the ammonia to a temperature suitable for use in the engine and the SCR device, respectively.

11. The fuel supply system according to claim 1, further comprising:
    a return line branched off of the exhaust line downstream of the SCR device and returned to the SCR device,
    wherein the $NO_x$ analyzer comprises: a first $NO_x$ analyzer disposed between the engine and the SCR device; and a second $NO_x$ analyzer disposed downstream of the SCR device, and,
    when analysis of values detected by the second $NO_x$ analyzer indicates that a concentration of nitrogen oxides in the exhaust gas is greater than a permissible level, the exhaust gas discharged from the SCR device is returned to the SCR device along the return line.

12. The fuel supply system according to claim 1, wherein the first fuel is one selected from among heavy fuel oil (HFO), low sulfur fuel oil (LSFO), ultra-low sulfur fuel oil (ULSFO), marine gas oil (MGO), methanol (MeOH), liquefied natural gas (LNG), liquefied petroleum gas (LPG), liquefied ethylene gas (LEG), and dimethyl ether (DME).

* * * * *